Dec. 5, 1939.    R. G. TAHON    2,182,100
AUTOMATIC VOLUME CONTROL DEVICE FOR WAVE TRANSMISSION SYSTEMS
Filed Sept. 3, 1937
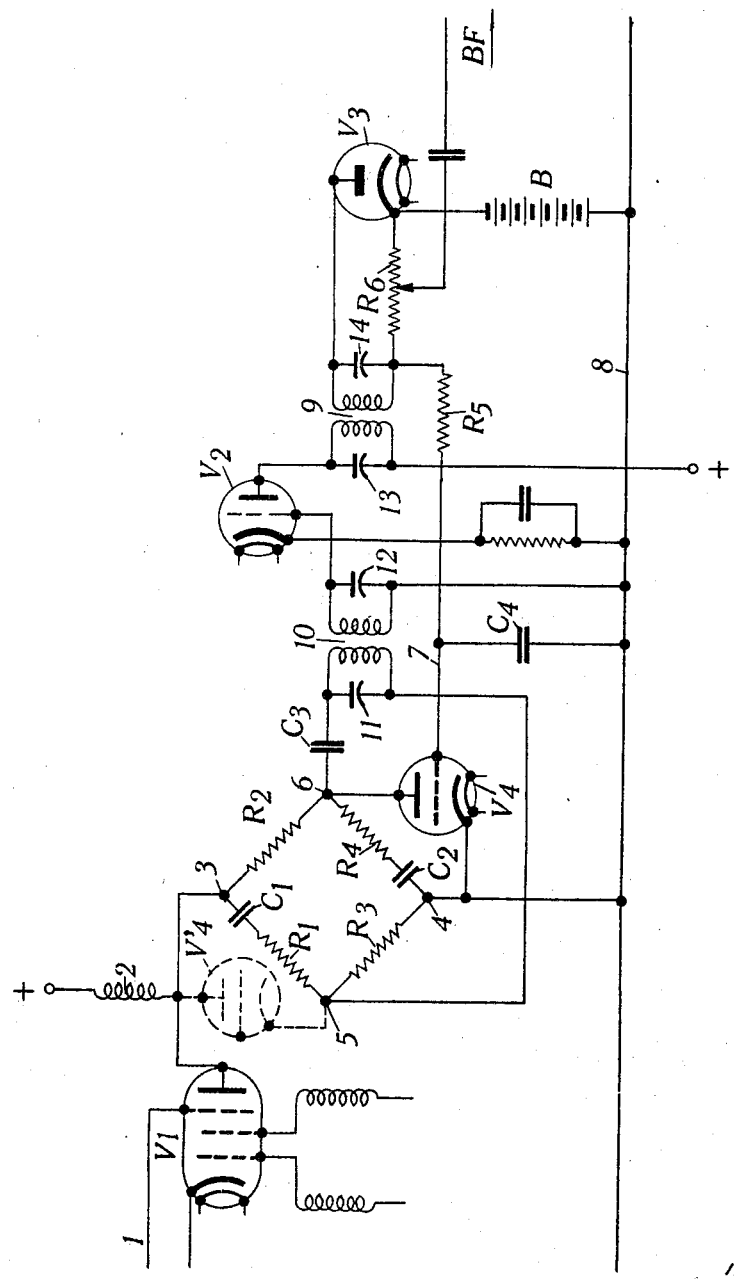
INVENTOR
R.G. TAHON
BY
ATTORNEY Patented Dec. 5, 1939

2,182,100

UNITED STATES PATENT OFFICE 2,182,100

AUTOMATIC VOLUME CONTROL DEVICE FOR WAVE TRANSMISSION SYSTEMS

Robert Georges Tahon, Paris, France, assignor to International Standard Electric Corporation, New York, N. Y.

Application September 3, 1937, Serial No. 162,299
In France September 19, 1936

2 Claims. (Cl. 250—20)

The present invention relates to thermionic amplifier circuits and particularly, to arrangements in which the conditions of operation of such circuits are automatically controlled in accordance with one or more characteristics of the signals which they transmit.

The invention in particular has the object of interposing in a circuit associating two valves, a transmission network one or more characteristics of which can be varied in accordance with a chosen characteristic of the signals transmitted. As the characteristics of these signals can vary over a considerable range, one of the objects of the invention is to provide a form of network which renders it possible to transmit without attenuation, signals of very low amplitude and to introduce when necessary an extremely high transmission loss between the two valves. In accordance with one feature of the invention, a coupling device introduced between two valves comprises an unbalanced network with which are associated means for varying the unbalance of such network in accordance with the amplitude of the signals to be transmitted.

The single figure of the accompanying drawing shows one embodiment of the invention as applied to the volume control of a radio receiver.

The received radio frequency signals are applied to the conductor 1 terminating in the control electrode of the pentode valve $V_1$ operating as the oscillator-modulator of a superheterodyne receiver. The plate of the valve $V_1$, fed by a battery through a choke coil 2, is connected to the point 3 of a Wheatstone bridge composed of four resistances, $R_1$, $R_2$, $R_3$ and $R_4$, two of which, $R_1$ and $R_4$, are placed in series with condensers $C_1$ and $C_2$ permitting the passage of alternating currents and opposing the passage of direct current. One of the resistances of the bridge $R_4$ in the example under consideration, is shunted by a variable impedance device adapted to be influenced by a current or a difference of potential. This device is represented here in the form of a triode valve $V_4$. The grid of this valve is biased over the conductor 7 through a resistance $R_5$, under the control of a potential derived from the signals amplified by the intermediate frequency amplifier $V_2$, the connection to the cathode of the valve $V_4$ and to the terminal 4 of the bridge circuit being effected by means of the earth conductor 8. The biasing battery B of the valve $V_4$ has its positive pole also connected to this earth conductor 8 and its negative pole to a terminal of a resistance $R_6$ placed in the cathode circuit of a detecting diode $V_3$ coupled by the coupling transformer 9 to the intermediate frequency amplifier $V_2$. On the resistance $R_6$ is the usual adjustable tapping for the low frequency output BF. 10 is another coupling transformer the primary of which is connected with the terminals 5 and 6 of the Wheatstone bridge. Variable or other condensers 11, 12 and 13, 14 are provided in shunt to the windings of the two coupling transformers 10 and 9 respectively. The condenser $C_3$ is a blocking condenser in order to avoid the direct passage of the direct current between the terminals 5 and 6 of the bridge. A condenser $C_4$ cooperating with the resistance $R_5$ permits the elimination from the bridge of the intermediate frequency currents which may interfere with the correct adjustment of bias of the valve $V_4$.

The operation of the arrangement is as follows: When signals of very weak intensity are transmitted to the output terminals of the coupling transformer 9, the rectified potential across the terminals of the resistance $R_6$ is small and, consequently, the bias of $V_4$ only depends on the potential of the battery B which is adjusted to a suitable value; the anode-cathode impedance of valve $V_4$ which is in shunt to the arm $R_4$ of the bridge, is at this time low (for example, 5000 ohms) and thus acts as a short-circuit and totally unbalances the bridge the resistances of which are so adjusted that balance is obtained when this shunt $V_4$ is eliminated. For example, the resistances $R_1$, $R_2$, $R_3$ and $R_4$ may be taken of the same value, for example, 100,000 ohms, the condensers $C_1$ and $C_2$ offering to the intermediate frequency sufficiently low impedances as to be negligible. The valve $V_4$ has its bias adjusted in such a manner that it operates on that portion of its characteristic in which small variations of bias correspond to impedance changes which are at first small and then as the bias increases become very great.

When the intensity of the signals at the output terminals of the coupling transformer 9 increases, the difference of potential across the terminals of the resistance $R_6$ increases, and, consequently, the bias of the valve $V_4$ increases in absolute value; the shunting effect of the impedance of the valve $V_4$ on the resistance $R_4$ is reduced in proportion as said impedance is increased, and the bridge more and more tends to its equilibrium. Consequently, the variations of potential between the ends 3 and 4 of one diagonal of the bridge have less and less influence on the corresponding difference of potential between the ends 5 and 6 of the other diagonal. The transmission loss introduced in the coupling circuit of the two valves $V_1$ and $V_2$ by the bridge network, rapidly increases and the automatic volume regulation, which was low for signals of low intensity, will consequently come into effective operation.

The transfer of energy between the oscillator-modulator $V_1$ and the intermediate frequency amplifier valve $V_2$ decreases more and more, which ensures the automatic volume control of the outgoing signals.

The embodiment which has just been described, is capable of numerous variations without departing from the scope of the invention.

For example, it is clear that two branches of the bridge instead of one may be shunted by a variable impedance device, that is to say, that the branch $R_1$ opposite to $R_4$, may be shunted by a valve $V'_4$ (shown in dotted lines on the drawing) similar to the valve $V_4$, and whose grid may be associated either with the grid circuit of $V_4$, or connected at a suitable point in the chain of valves constituting the receiver, so that the relative bias of the valves $V_4$ and $V'_4$ vary in such a sense that these two valves cooperate in order to cause the balancing of the bridge to vary in a suitable manner, for example, as described.

The use of such valves $V_4$ and $V'_4$ also renders it possible to cause the degree of balancing of the bridge to be varied in different ratios according to the amplitude of the signals to be transmitted or one of these valves may serve to correct the action of the other while taking into consideration the duration of the sudden variations of amplitude of the signals.

Although in the example under consideration the various branches of the bridge have been mentoned as being pure resistances, it is obvious that in certain cases it may be desirable to employ not resistances but impedances which may be adjustable, for example, by means of a control device, which may also adjust the value of the battery B in such a way as to vary the operative conditions of the system as desired.

It is also clear that valves such as $V_4$ may be replaced by impedances which vary according to the current which passes through them for example, coils with magnetisable cores whose saturation varies in accordance with the intensity of the current in said coil and causes the intensity of the signals which pass through the windings to vary. In this case, it would also be possible to replace one or more of the resistances of the bridge by such an impedance, the bridge being balanced by the value of the current corresponding to that of a battery without the additional drop of tension produced by the current due to the amplified signals.

What is claimed is:

1. A multistage vacuum tube radio receiver circuit of the type having a signal detector stage and a high frequency stage preceding said detector stage and coupled thereto, which comprises a bridge circuit coupling said high frequency stage to said detector stage, a grid-controlled variable impedance tube connected in one arm of said bridge circuit for varying the coupling between said high frequency stage and said detector stage, connections for deriving from said detector stage detected signal waves of audio frequency for the output of said receiver, further connections for deriving detected signals from the output of said detector, means for smoothing said last mentioned signals to provide a unidirectional controlling signal, and means for applying said control signal to the grid of said variable impedance tube to vary its impedance in accordance with said unidirectional control signal.

2. A superheterodyne radio receiver according to claim 1, wherein said variable impedance tube is directly controlled by said unidirectional signal, and wherein said bridge circuit is connected in the intermediate frequency stage of said superheterodyne receiver.

ROBERT GEORGES TAHON.